United States Patent [19]

Lill et al.

[11] Patent Number: 5,734,244
[45] Date of Patent: Mar. 31, 1998

[54] SAFETY APPLIANCE FOR MOVABLE PARTS

[75] Inventors: Anton Lill, Lauffen; Werner Gakenholz, Bietigheim-Bissingen; Werner Philipps, Ludwigsburg, all of Germany

[73] Assignee: ITT Automotive Europe GmbH, Frankfurt, Germany

[21] Appl. No.: 612,955

[22] PCT Filed: Aug. 30, 1994

[86] PCT No.: PCT/EP94/02868

§ 371 Date: May 15, 1996

§ 102(e) Date: May 15, 1996

[87] PCT Pub. No.: WO95/07568

PCT Pub. Date: Mar. 16, 1995

[30] Foreign Application Priority Data

Sep. 11, 1993 [DE] Germany ............... 43 30 904.6

[51] Int. Cl.$^6$ ............................................. G05B 5/00
[52] U.S. Cl. ................... 318/452; 318/560; 318/600; 318/567; 364/474.28; 395/89
[58] Field of Search .............................. 318/560, 567, 318/600, 569, 452; 364/474.28; 395/89

[56] References Cited

U.S. PATENT DOCUMENTS

| | | | |
|---|---|---|---|
| 5,054,494 | 10/1991 | Lazzaro et al. | 364/474.28 X |
| 5,265,194 | 11/1993 | Kanamori | 395/89 |

FOREIGN PATENT DOCUMENTS

| | | |
|---|---|---|
| 0425898 | 10/1790 | European Pat. Off. . |
| 0328838 | 8/1989 | European Pat. Off. . |
| 0422388 | 4/1991 | European Pat. Off. . |
| 4127047 | 2/1893 | Germany . |
| 3034118 | 3/1982 | Germany . |
| 3136746 | 6/1983 | Germany . |
| 3311524 | 10/1984 | Germany . |
| 3532078 | 4/1986 | Germany . |
| 4000730 | 8/1991 | Germany . |
| 4204017 | 2/1992 | Germany . |
| 4203659 | 8/1993 | Germany . |

OTHER PUBLICATIONS

English Translation of the International Preliminary Examination Report for Application PCT/EP94/02868.
Search Report of the German Patent Office for Application No. P4330904.6.

*Primary Examiner*—Karen Masih
*Attorney, Agent, or Firm*—Thomas N. Twomey; J. Gordon Lewis

[57] ABSTRACT

An appliance which, through motor-driven operation, is movable toward a closing edge, in particular, for use with window regulators and sliding roofs of automotive vehicles. For this purpose, the number of revolutions of the motor is permanently detected, with the number of revolutions of the motor being measured in successive measuring intervals. The number of revolutions is to be a measure of the force acting on the pane. Respectively the last four measured values are detected in a sliding register and are subjected to evaluation. For this purpose, first a start-up value is detected. The start-up value respectively is the third last measured value $n_{i-3}$ if the difference D between the current measured value and the third last measured value does not exceed a predetermined differential threshold $D_{max}$. For, in that case, the start-up value remains unchanged. Subsequently, the difference A is formed between the start-up value and the current value $n_i$. If the latter is above a predetermined response threshold $A_{max}$, the anti-clamping system responds. This means that the driving motor is turned off and, optionally, is inverted in the direction of rotation thereof. More specifically, the forces acting on the pane are successively integrated from one measured interval to the next as long as there is some sort of increase from one measured interval to the next. As soon as the integration value A reaches the response threshold $A_{max}$, the anti-clamping system responds. In this way a sensitive and rapidly responding protection against clamping is realized, wherein error signals based on fluctuations in the frictional resistance of the pane guide are suppressed.

7 Claims, 3 Drawing Sheets

SAFETY APPLIANCE FOR MOVABLE PARTS

TECHNICAL FIELD

The invention is concerned with a safety appliance for manipulatable parts which, through motor-driven operation, are movable toward a closure edge, in particular, for use with window regulators and sliding roofs of automotive vehicles.

BACKGROUND OF THE INVENTION

Electromotive drives for windows and sliding roofs are being increasingly assembled in automotive vehicles to relieve the driver or front-seat passenger from the effort involved with opening and closing a window or a sliding roof. Although these drives are an attractive feature, they must be prevented from closing or opening under certain conditions.

It has, therefore, been previously suggested to provide safety appliances intended to prevent items or parts of the body from being clamped. For example, DE-OS 37 36 400 sets forth that it is known to monitor the consumption of current and/or the number of revolutions of the driving motor or to use pressure- or temperature-sensitive sensors responding and generating a signal if foreign matter is present during the closure process, between the window edge and the closure edge of the frame.

Both the number of revolutions and the consumption of current of the driving motor are means for indirectly measuring the forces acting on the sliding member. Apart from the difficulty directly measuring absolute values, the problem involved with safety devices based on the evaluation of absolute quantities resides in determining the response threshold at which the anti-clamping system is to respond. A low-level threshold may cause the switch-off means to respond even if there is no danger for an item to be clamped. For, the lateral guide of the pane or sliding roof also exerts forces on the pane that vary in accordance with the ambient conditions. For example, at low temperatures, running of the guide is substantially less smooth. If the threshold is high, the anti-clamping means will respond be too late.

It has already previously been suggested (European patent application No. 0442388) not to determine the absolute quantity but rather the change from one measuring interval to the next. However, even then it is difficult to determine the response threshold. If it is set too small, the switch-off device may become operative upon the occurrence of usual fluctuations in the resistance of the pane guide. If the threshold is set too high it may be that the anti-clamping system does not respond once a soft item is clamped because the force during squeezing together a soft body, from one measuring point to the other, only irrelevantly increases with the consequence that the anti-clamping system does not respond although very high forces act upon the clamped-in item which forces have, however, been built up in small increments.

According to the description of the state of art the problem encountered resides in providing a safety appliance insuring a sensitive and early response which only occurs if an item is actually in danger to be clamped.

It is, therefore, suggested by the invention to provide a measuring instrument detecting in successive measuring intervals a quantity representing the operating force on the movable part. Moreover, an evaluator is provided determining the difference between the measured quantity in a start-up interval and the measured quantity in a final interval, with the drive being switched off as soon as the difference exceeds a response threshold. The start-up interval is defined in that respectively a quantity is measured in the measuring intervals between the start-up interval and the final interval which exceeds the value in a preceding measuring interval by a predetermined amount, i.e. the difference threshold. The evaluation pattern can be used irrespective of the absolute quantity actually detected. It can be the current consumption or power absorption of the motor or the number of revolutions of the motor. Also, the forces applied to the sliding member can be directly measured.

The basic principle of the invention resides in that the changes in the force, from one measured interval to the other, are integrated as long as a certain increase is achieved from one measured interval to the other. If the increase in force drops below a predetermined value, the integration is restarted at zero.

In this manner, fluctuations in force that are not caused by clamped-in items will not be registered. Temporary interferences, may start an integration which, however, does not accumulate until the threshold value is reached. Generally, the integration will discontinue after a few steps. However, if the force grows slowly but steadily, as is the case, for example, with soft clamped-in items, the drive is discontinued as soon as the integrated value reaches the threshold. However, as already minor changes in force are included in the integration at the beginning of the clamping process, the safety appliance will respond in time.

An easily detected quantity representing the operating force is the number of revolutions of the driving motor. The same is, in turn, most easily detected in that the circulation period per revolution of the driving shaft of the motor is determined.

The evaluator, advantageously, contains a slide register comprising register numbers 1 to 4, with No. 1 containing the current value and Nos. 2 to 4 the preceding measured quantities.

The actuator contains another register for the start-up measured quantity which is overwritten by the value from the No. register 4 of the slide register only, once the difference between the values of registers Nos. 4 and 1 is less then a predetermined differential threshold value.

Subsequently, the difference between the value in register No. 1 and the value in the register for the start-up measured value is formed. If the difference exceeds the threshold value, the anti-clamping system will respond.

In addition, it has proved to be advantageous once the values in the slide registers, prior to evaluation thereof, be subjected to modification resulting in that the value is flattened to a certain extent. As a rule, it is sufficient to change the value in register No. 3 to the effect that, initially, the peak value is determined in registers Nos. 1 and 2. Once the value in register No. 3 is between the said peak value and the value in the No. 4 register, it will not be modified. If it is outside the said range of values, in special cases, the average value between the value in register No. 4 and the peak value is written into register No. 3.

DETAILED DESCRIPTION OF THE PREFERRED EMBODIMENTS

Figure 1A:
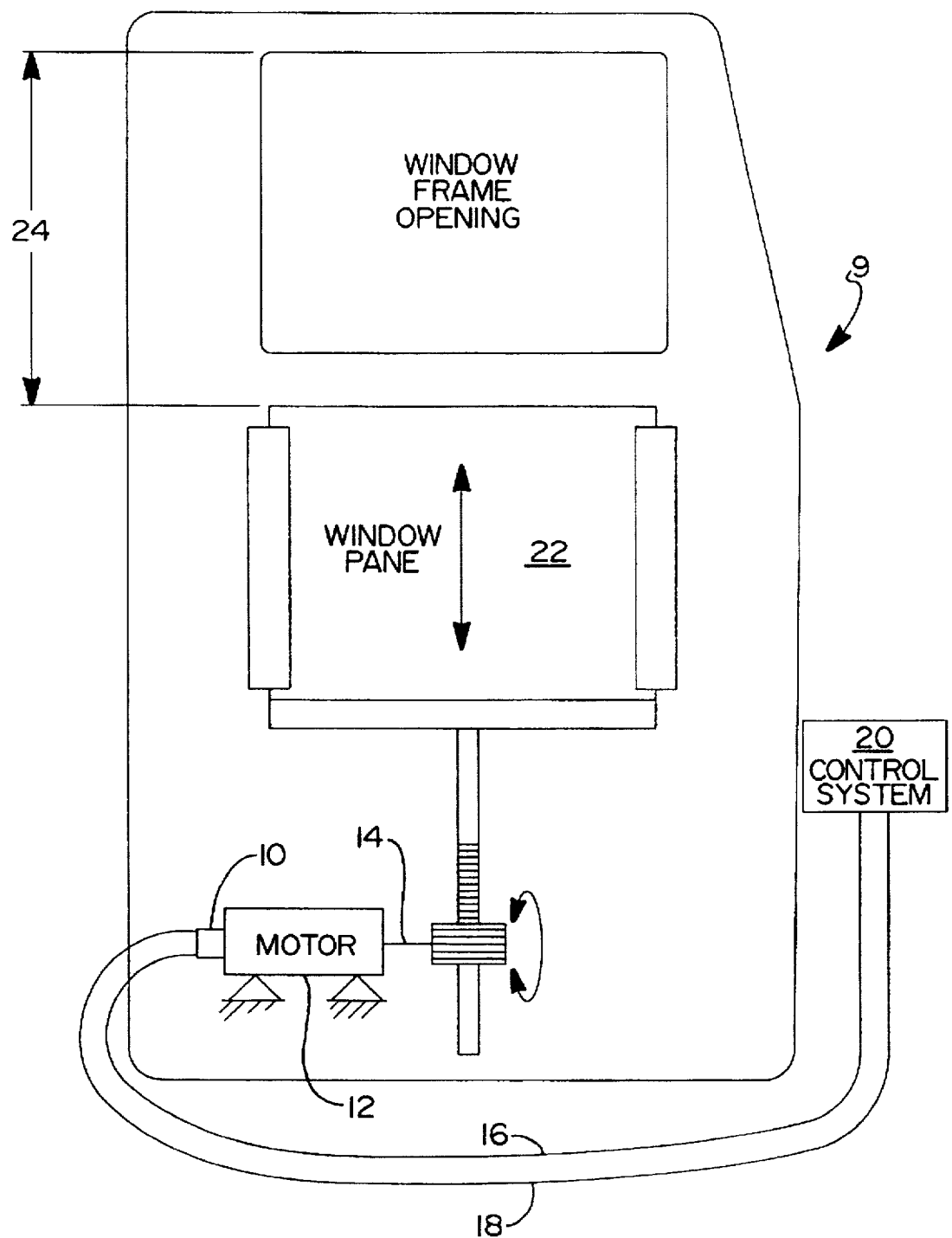
FIG. 1A is a schematic representation of a window lift mechanism commonly found in automobile doors.
Figure 1B:
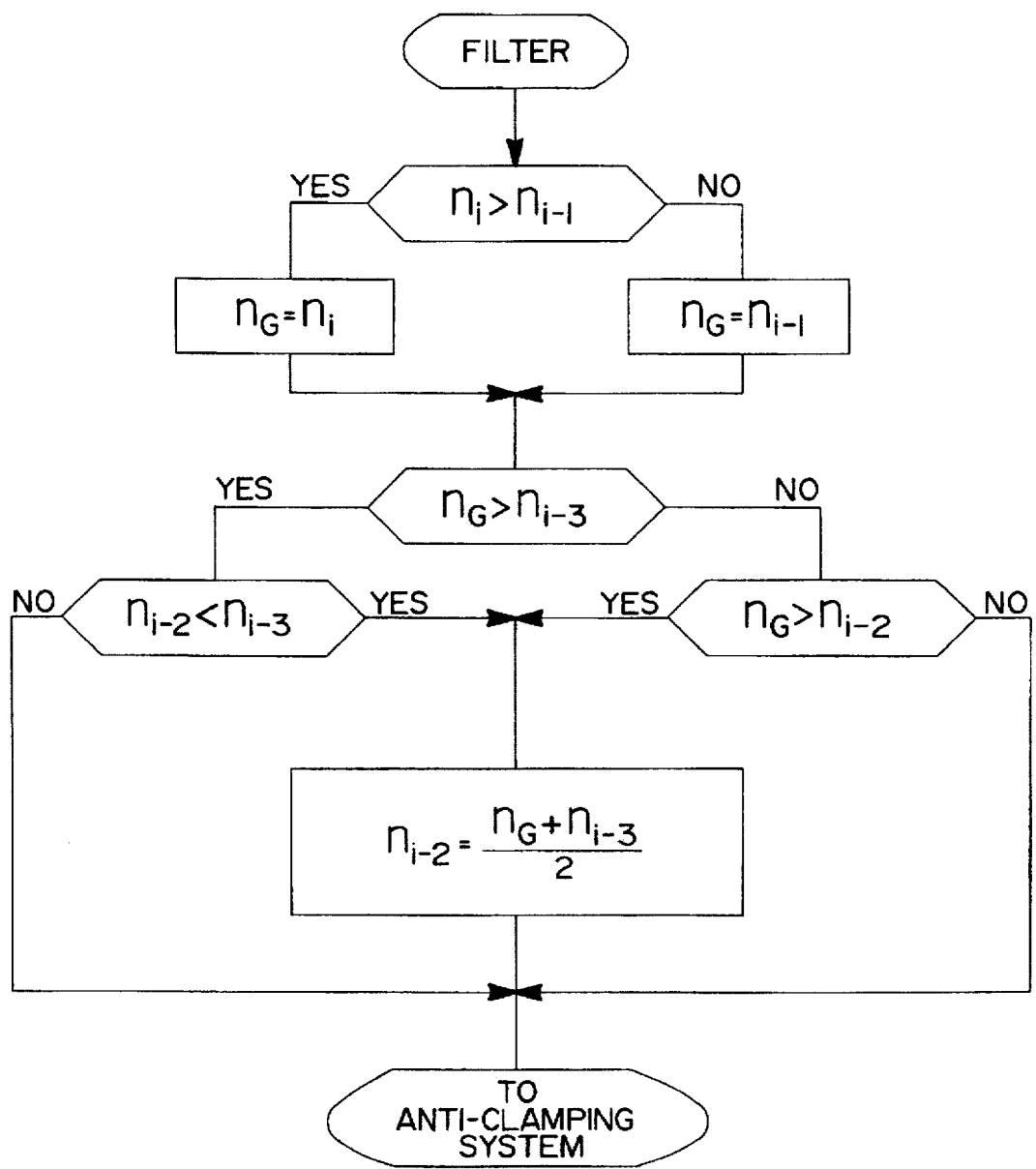
FIG. 1B is a logic flow diagram showing the filtering algorithm of the present invention.

One form of embodiment of the invention will now be explained in closer detail, with the required computing steps being shown in the two logic flow diagrams of FIGS. 1 and 2, with the part to be moved, e.g. a window of a private passenger car, and the driving motor, not shown.

A sensor is provided on the motor, which supplies one pulse per revolution of the armature spindle to the control system. The sensor includes two outputs the signals of which are staggered by 90°, with one of the said outputs of the sensor leading to an interrupt input of the control system. If, during a flank, the level of the second sensor output on the interrupt input is contemplated, this will enable the direction of revolution of the motor to be identified. By counting the pulses on the interrupt input, under consideration of the direction of revolution, the present position of the pane can be determined. To that extent it will be necessary for the counter to be set, in a predetermined position of the pane, to a synchronous value.

In this way, the position of the pane, depending on the layout of the motor gear, can be determined with a precision of about 2 to 3 mm.

The total closing distance 24 of a side window of an automotive vehicle corresponds to approximately 200 to 300 pulses. A synchronous value is set once the pane blocks on the upper stop. The synchronous value is selected slightly larger than the computed number of pulses across the closing distance of the pane. With a pane, the closing distance of which can be represented by 226 pulses, the synchronous value is set, for example, to 250.

The circuit hereinafter described by which a protection against clamping is insured, is activated only as long as the pane is not moved into the closing fold of the closing edge of the frame. In the example of embodiment this corresponds to a pulse value of 242.

The number of revolutions of the motor is determined by identifying the time between two successive pulses. The time range to be determined is between about 10 and 100 milliseconds, corresponding to a number of revolutions of between 6000 and 600 revolutions per minute.

The evaluator provides a slide register with locations Nos. 1 through 4. A new measured value entered as the number of revolutions into location No. 1 is detected in each cycle, i.e. with each revolution of the driving motor. Allocations of the other registers are previously displaced by one register. The four registers thus represent the last four measured values.

Prior to a further evaluation first the measured values are filtered or corrected, respectively, on register No. 3. The way of filtering is show in FIG. 1.

The actual measured value is designated by $n_i$ which is filed in register No. 1. The indexed indications I-1, I-2 and I-3 relate to the preceding measured values filed in registers Nos. 2 to 4. The computing pattern contains a first branch for checking whether the value $n_i$ exceeds the value $n_{i-1}$. Depending on the result of such a check, the value $n_i$ or $n_{i-1}$ is filed in an intermediate register which hereinafter is designated by $n_g$. Accordingly, $n_g$ is the higher of the two values $n_i$ or $n_{i-1}$. In a next two-phase step it is checked whether the measured value $n_{i-2}$ is between $n_g$ and $n_{i-1}$. For that purpose it is first checked whether $n_g$ exceeds $n_{i-3}$; if so (left-hand branch), it is checked whether $n_{i-2}$ is less than $n_{i-3}$. In that case, the value $n_{i-2}$ is replaced by the average value of $n_g$ and $n_{i-3}$, and is overwritten in the No. 3 register.

If the result of this check is that $n_{i-3}$ exceeds $n_g$ (right-hand branch), it is checked whether $n_{i-2}$ is less than $n_g$. In that case, the average value is formed as described. Otherwise, the value $n_{i-2}$ remains unchanged and No. 3 register is not overwritten.

Figure 2:
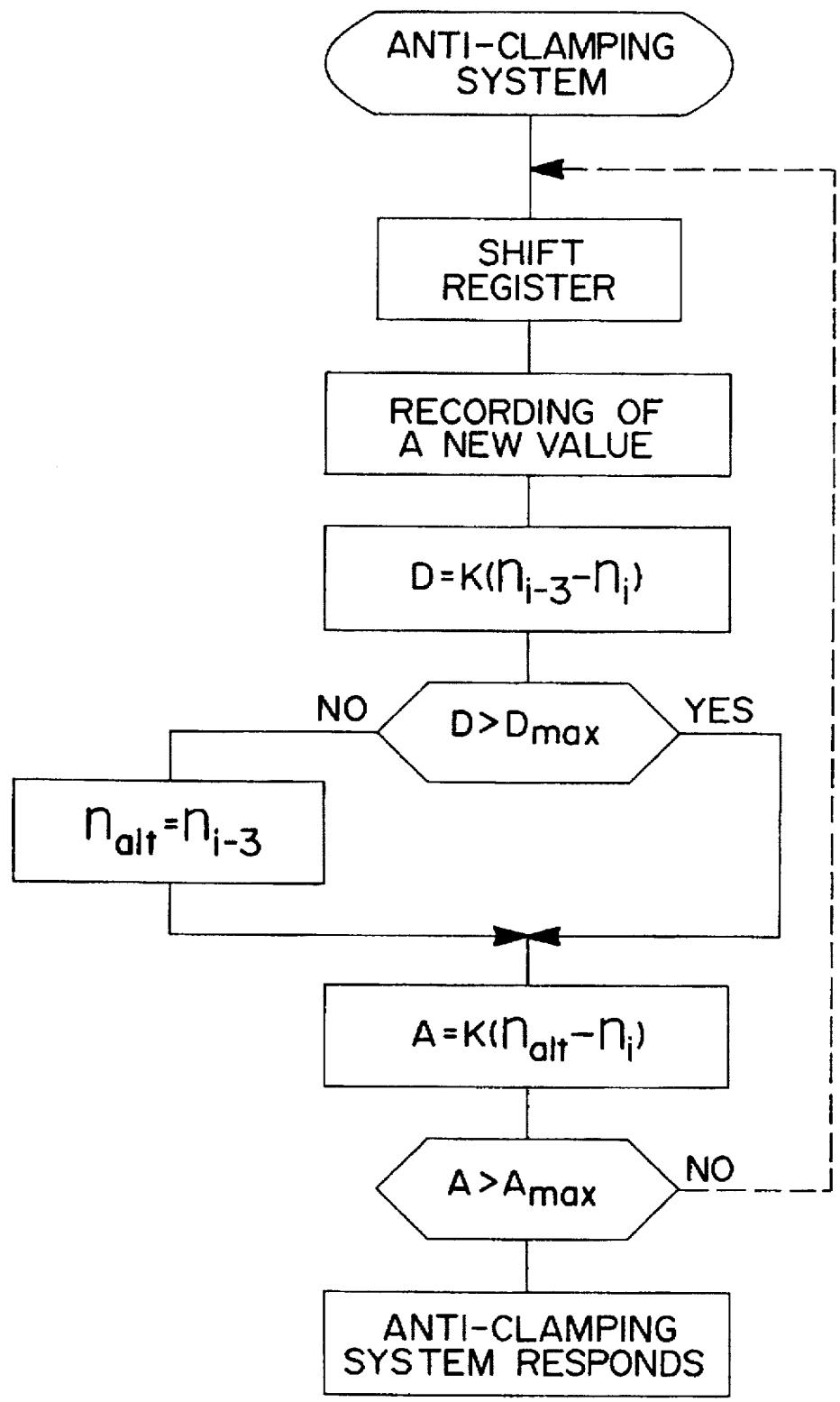
FIG. 2 is a logic flow diagram showing the anti-clamping algorithm of the present invention.

Activation of the anti-clamping system is according to the algorithm of FIG. 2. For this purpose it is necessary that a synchronous value is set for determining the position, that the driver actuates a corresponding button and that at least four values for the number of revolutions have been detected. The anti-clamping system is activated only in the central area of the window closing distance. The first 50 mm, measured from the bottom stop, are covered with no activation of the anti-clamping system. Deactivating of the mechanism in these areas, initially, results in high numbers of revolution rapidly dropping thereafter. The decrease in the number of revolutions would pretend an increase in force causing the anti-clamping system to respond by way of inadvertence. Also a short distance ahead of the upper stop, the anti-claming system is deactivated. This deactivation is present because the pane, over this distance, runs in a fold requiring high operating forces. If the anti-clamping protection system were deactivated, the window would be re-opened.

A response of the anti-clamping system means that first the motor is immediately switched off and after a delay of 50 milliseconds the pane is moved by about 50 mm in the opening direction to release the item. In any case, an opening of at least 200 mm should be released, i.e. the distance between the upper edge of the pane and the upper folding edge should amount to 200 mm.

As previously explained, the number of revolutions of the engine is measured, which, as is well known, is in a linear relationship with the operating force of the engine as long as a constant supply voltage for the engine is available. This can be assumed over the duration of a closing operation.

The anti-clamping algorithm comprises the following steps: The locations of the register are displaced by respectively one location. Then a new current value is read into register No. 1. Subsequently, filtering is performed as previously described and then the actual increase in force is determined by forming the difference between the values in registers 1 and 4. These are the values of $n_i$ and $n_{i-3}$. Through multiplication by an engine-specific constant K, a current differential value D of the force is obtained. This value is compared to the differential threshold $D_{max}$ which in the example of embodiment is about 10N. If the rise is below the threshold value, the value $n_{i-3}$ is written into an intermediate register which hereinafter is designated by $n_{alr}$. If the rise is above the threshold, the intermediate register is not changed. Hence, the intermediate register always stores the measured value which is present at the beginning of a rising force curve. It can be called the "start-up value". Then the difference is formed between $n_i$ and $n_{alr}$. This value is also multiplied by the motor-specific K; a force value A is obtained. If the value A is above a response threshold value $A_{max}$, the anti-clamping system responds. The response threshold in the example of embodiment is $A_{max}$=30N. Otherwise, the computing pattern restarts by displacing the locations of the register and by putting in a new measured value.

We claim:

1. A method of manipulating movable vehicle appliances through motor-driven operation, comprising the steps of:

(A) measuring first and second values representing an operating force on a movable vehicle appliance, (B) measuring third and fourth values representing the operating force exerted on the movable vehicle appliance, (C) determining a difference between the first and second measured values to generate a first interval value, (D) determining a difference between the third and fourth measured values to generate a second interval value, (E) determining a difference between the second interval value and the first interval value to determine if it exceeds a predetermined threshold, (F) ceasing movement of said movable vehicle appliance if the result of step (E) is positive.

2. The method of claim 1 for a driving motor having a revolving driving shaft, further including the step of measuring a number of revolutions of the driving motor.

3. The method of claim 2, further including the step of determining a rotation time per revolution of the driving shaft of the driving motor.

4. The method of claim 1, further including the steps of storing said first, second, third and fourth values in a slide register having first, second, third and fourth registers.

5. The method of claim 4, further including the step of modifying the values stored in the slide register.

6. The method of claim 5, further including modifying the values in the slide register according to a predetermined regulating pattern.

7. The method of claim 6, further including determining which of the first and second registers contains the largest value and then comparing that largest value to the value in the fourth register.

* * * * *